(12) United States Patent
Kumar et al.

(10) Patent No.: US 7,065,597 B2
(45) Date of Patent: Jun. 20, 2006

(54) METHOD AND APPARATUS FOR IN-BAND SIGNALING OF RUNTIME GENERAL PURPOSE EVENTS

(75) Inventors: Mohan J. Kumar, Aloha, OR (US); Prashant Sethi, Folsom, CA (US); Sridhar Muthrasanallur, Tumwater, WA (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 10/187,385

(22) Filed: Jun. 28, 2002

(65) Prior Publication Data

US 2004/0003159 A1 Jan. 1, 2004

(51) Int. Cl.
*G06F 13/24* (2006.01)
*G06F 13/00* (2006.01)
*G06F 13/42* (2006.01)

(52) U.S. Cl. .............. 710/260; 710/302; 710/304; 710/105; 719/318

(58) Field of Classification Search ........ 710/301–306, 710/260, 266, 268, 105; 719/318
See application file for complete search history.

(56) References Cited

U.S. PATENT DOCUMENTS 5,793,994 A * 8/1998 Mitchell et al. ............ 710/105
5,805,902 A * 9/1998 Kikinis et al. ............. 710/261
5,913,037 A * 6/1999 Spofford et al. ........... 709/226
5,974,556 A * 10/1999 Jackson et al. ............ 713/322
6,691,192 B1 * 2/2004 Ajanovic et al. .......... 710/107
2003/0115513 A1 * 6/2003 Harriman et al. ............ 714/49

OTHER PUBLICATIONS

"PCI Express Base Specification." Revision 1.0. PCI Special Interest Group. Apr. 29, 2002.*
"PCI Local Bus Specification." Revision 2.3. PCI Special Interest Group. Mar. 29, 2002.*
"PCI-SIG Introduces 'PCI Express (TM)' (Formerly 3GIO) High-Speed Serial Interconnect Specification." Microsoft PressPass. Apr. 17, 2002. Retrieved from Internet Nov. 22, 2004. <http://www.microsoft.com/presspass/press/2002/apr02/04-173GIOpr.asp>.*
"PCI Local Bus Specification". Revision 2.2. Dec. 18, 1998. PCI Special Interest Group. pp. ii and 213-220.*
"3GIO Base Specificaiton" Revision 1.0. Release Candidate. Feb. 22, 2002. Compaq Computer Corporation et al. pp. 2, 11, 34-35, and 245-247.*
Advanced Configuration and Power Interface Specification. Revision 2.0. Compaq Computer Corporation et al. Jul. 27, 2000.*

* cited by examiner

*Primary Examiner*—Rehana Perveen
*Assistant Examiner*—Thomas J. Cleary
(74) *Attorney, Agent, or Firm*—David L. Guglielmi

(57) ABSTRACT

A method and apparatus for communicating general purpose events in-band from a downstream controller is presented.

11 Claims, 2 Drawing Sheets

Prior Art    FIG. 1
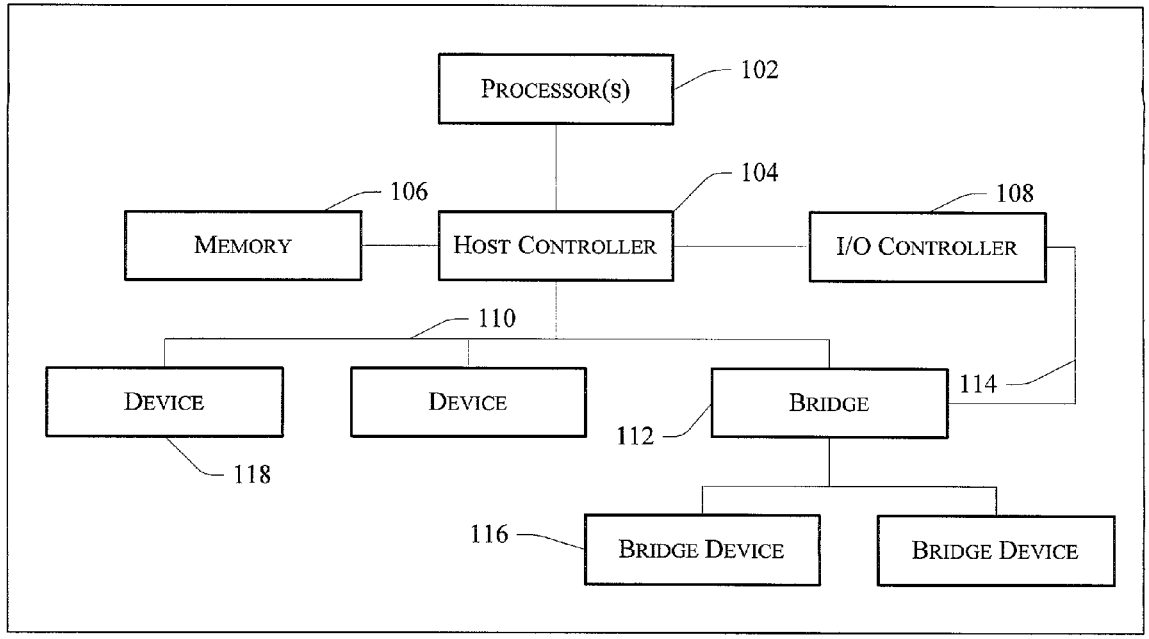
FIG. 2
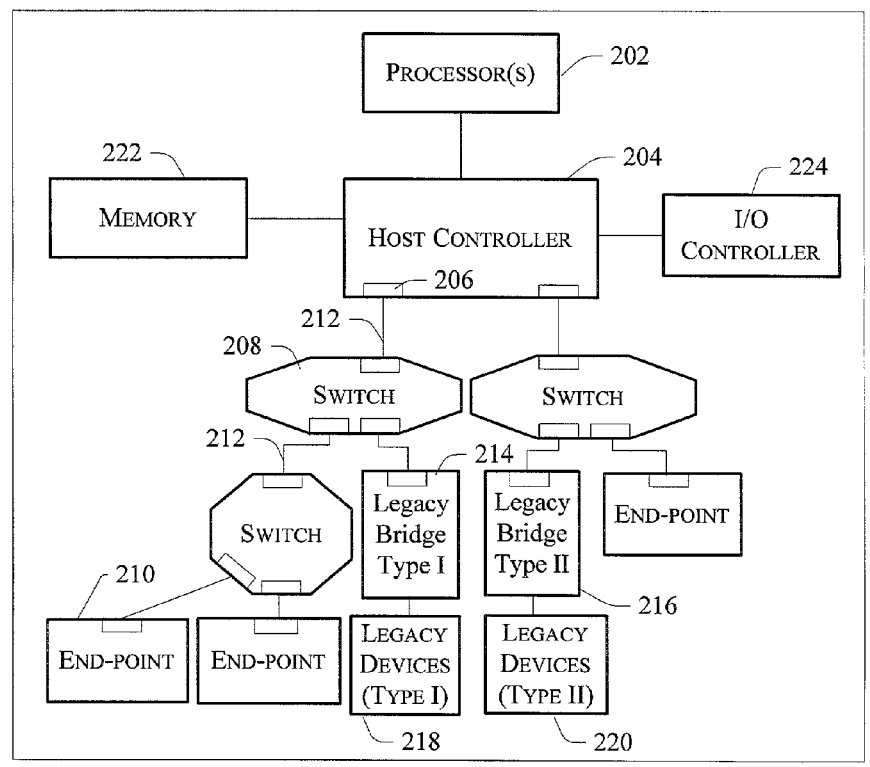

METHOD AND APPARATUS FOR IN-BAND SIGNALING OF RUNTIME GENERAL PURPOSE EVENTS

TECHNICAL FIELD

Embodiments of the invention relate to the field of computing architecture. More particularly, embodiments of the invention relate to a method and apparatus for in-band signaling of runtime general purpose events.

BACKGROUND

Advanced Configuration and Power Interface Specification (ACPI), Revision 2.0, Compaq Computer Corporation, Intel Corporation, Microsoft Corporation, Phoenix Technologies Ltd. and Toshiba Corporation, published Jul. 27, 2000, describes an interaction between computing hardware and software. In computing devices that comply with the ACPI specification, the hardware notifies the software, in particular the operating system (OS) executing on the computing device of runtime events, such as, e.g., when a device is plugged into the computing device while still powered on. This is colloquially referred to as hot plugging, which is a type of runtime general purpose event.

Most computing devices have specialized components for handling general purpose events and for notifying the ACPI OS. These specialized components, which are typically part of a bus bridge or input/output (I/O) controller within the computing device architecture, have inputs or side-band signals, called general purpose inputs, with which other components of the computing device can signal a general purpose event. When a general purpose input is asserted, a System Control Interrupt (SCI) is generated to notify the ACPI OS. The general purpose input is typically latched, because the ACPI OS must determine the cause of the SCI to correctly identify the event.

FIG. 1 is a block diagram of a conventional computing architecture for detecting and communicating such general purpose events. As shown, computing device 100 includes processor(s) 102, host controller 104, memory 106, I/O controller 108, bus 110, bridge 112, general purpose input 114, bridge device 116, and device 118, each logically coupled as shown. I/O controller 108 is capable of generating an SCI to notify the ACPI OS of a general purpose event. Bridge 112 is capable of detecting a hot plug of bridge device 116, and bridge 112 will notify I/O controller 108 of such a hot plug by asserting general purpose input 114.

The need for general purpose input 114 limits computing device 100 in that wherever bridge 112 is located, an additional wire is needed to couple bridge 112 with I/O controller 108. This doesn't present a significant problem when bridge 112 is located within the same case or chassis as I/O controller 108, however it would present a problem if bridge 112 where to located in a separate case or chassis from I/O controller 108. Further, for every bridge that supports hot plug of devices present in the system (such as bridge 112), it requires a corresponding sideband signal (such as 114). This adds to the cost, complexity and in general introduces a scalability problem for the platform.

BRIEF DESCRIPTION OF THE DRAWINGS

Embodiments of the invention are illustrated by way of example, and not by way of limitation in the figures of the accompanying drawings in which like reference numerals refer to similar elements.

FIG. 1 is a block diagram of a conventional computing architecture.

FIG. 2 is a block diagram of an example computing architecture suitable for use with the present invention.

DETAILED DESCRIPTION

Figure 3:
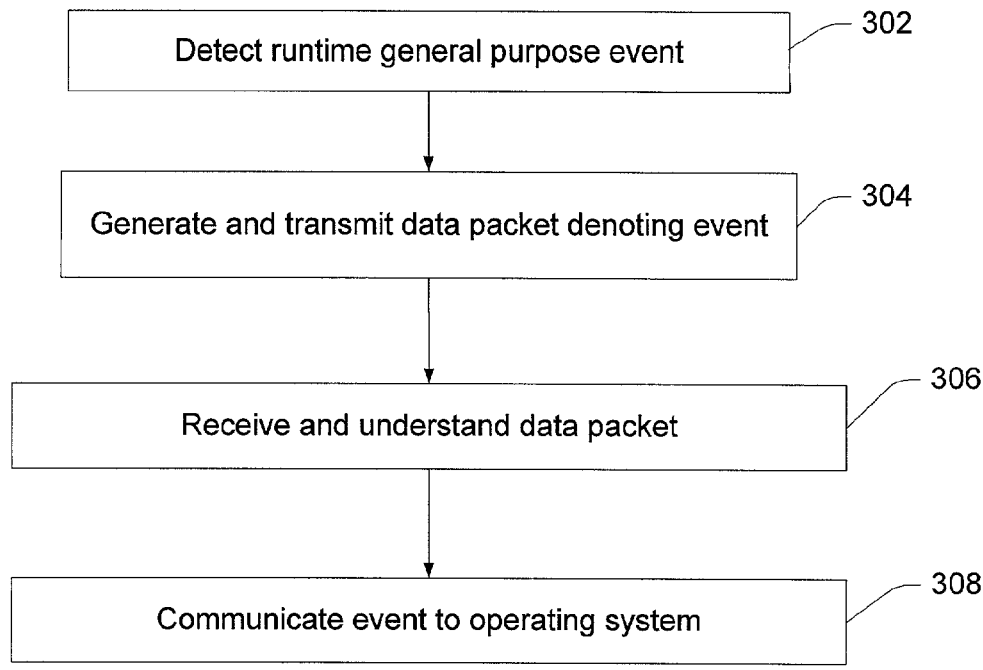
FIG. 3 is a flow chart of an example method of processing a general purpose event, according to one example embodiment of the teachings of the present invention.

A method and apparatus for in-band signaling of runtime general purpose events is presented. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

FIG. 2 is a block diagram of an example computing architecture suitable for use with the present invention. In accordance with the illustrated example of FIG. 2, computing device 200 is depicted comprising one or more of processor(s) 202, a host controller 204, switches 208, end-points 210, I/O controller 224, memory 222, legacy bridge type I 214, legacy bridge type II 216, and legacy devices 218 and 220, each coupled as shown. Host controller 204, switch(es) 208, end-points 210, I/O controller 224, legacy bridge type I 214, and legacy bridge type II 216 are endowed with one or more instances of an enhanced general input/output (EGIO) communication interface 206 to facilitate one or more aspects of the present invention. In one embodiment, EGIO communication interface 206 complies with Peripheral Component Interconnect (PCI) Express Base Specification, Revision 1.0, PCI Special Interest Group, released Apr. 29, 2002.

As shown, each of the elements 204, 208, 210, 214, and 216 are communicatively coupled to at least one other element through a communication link 212 supporting one or more EGIO communication channel(s) via the EGIO interface 206. As introduced above, computing device 200 is intended to represent one or more of any of a wide variety of traditional and non-traditional computing systems, servers, network switches, network routers, wireless communication subscriber units, wireless communication telephony infrastructure elements, personal digital assistants, set-top boxes, or any electric appliance that would benefit from the teachings of the present invention. It should be appreciated that the elements of computing device 200 may be located in separate cases or chassis from one another.

In accordance with the illustrated example implementation of FIG. 2, computing device 200 is endowed with one or more processor(s) 202. As used herein, processor(s) 202 control one or more aspects of the functional capability of the computing device 200. In this regard, processor(s) 202 are representative of any of a wide variety of control logic including, but not limited to one or more of a microprocessor, a programmable logic device (PLD), programmable logic array (PLA), application specific integrated circuit (ASIC), a microcontroller, and the like. The communication link between processor(s) 202 and host controller 204 need not be the same type of link as communication link 212.

Host controller 204 provides a communication interface between processor 202 and/or a processor/memory complex and one or more other elements 208, 210, and 224 of the computing device EGIO architecture and is, in this regard, the root of the EGIO architecture hierarchy. As used herein, a host controller 204 refers to a logical entity of an EGIO hierarchy that is closest to a host bridge, a memory controller hub, or a combination of the above, or some combination of chipset/CPU elements (i.e., in a computing system environment). In this regard, although depicted in FIG. 2 as a single unit, host controller 204 may well be thought of as a single logical entity that may well have multiple physical components. According to the illustrated example implementation of FIG. 2, host controller 204 is populated with one or more EGIO interface(s) 206 to facilitate communication with other peripheral devices, e.g., switch(es) 208, end-point(s) 210 and legacy bridge(s) 214, or 216.

I/O controller 224 works in conjunction with a basic input/output system (BIOS) to control I/O activity, and also ACPI interfaces to the operating system. The communication link between I/O controller 224 and host controller 204 need not be the same type of link as communication link 212. Communication from host controller 204 to I/O controller 224 may even involve side-band signals, for example general purpose inputs. Because host controller 204 and I/O controller 224 are typically implemented in close proximity to one another, the additional wires for side-band signaling may be easily implemented. The functionality of I/O controller 224 may even be implemented into the component of host controller 204. Communication between I/O controller 224 and all end-points and devices downstream from host controller 204 is signaled in-band. In other words, there are no side-band signals between I/O controller 224 and any end-points, devices, bridges or switches that interface directly or indirectly with an EGIO interface 206 of host controller 204. Run-time general purpose events are communicated as explained in greater detail with reference to FIG. 3 and FIG. 4. Removal of side-band signals such as general purpose input 114 to I/O controller 224 not only allows for more scalability in the computing device design, but also provides some cost savings and enables creation of split chassis designs.

Memory 222 provides storage for software such as BIOS and operating system instructions and data. Reads from and writes to memory 222 are controlled by host controller 204. The communication link between memory 222 and host controller 204 need not be the same type of link as communication link 212.

Switches 208 have at least one upstream port (i.e., directed towards the host controller 204), and at least one downstream port. According to one implementation, a switch 208 distinguishes one port (i.e., a port of an interface or the interface 206 itself) which is closest to the host controller as the upstream port, while all other port(s) are downstream ports.

Examples of end-points 210 include, but are not limited to, EGIO compliant graphics device(s), EGIO-compliant storage device(s), and/or devices that implement a connection between EGIO and some other interface such as a universal serial bus (USB), Ethernet, and the like.

EGIO to Legacy bridges 214, 216 are specialized endpoints 210 that include substantial software support, e.g., full software support, for the legacy devices (218, 220) they interface to the EGIO architecture. In this regard, a legacy bridge 214, 216 typically has one upstream port (but may have more), with multiple downstream ports (but may just have one).

As used herein, link 212 is intended to represent any of a wide variety of communication media including, but not limited to, copper lines, optical lines, wireless communication channel(s), an infrared communication link, and the like. According to one example implementation, an EGIO link 212 is a differential pair of serial lines, one pair each to support transmit and receive communications, in compliance with the PCI Express specification.

FIG. 3 is a flow chart of an example method of processing a general purpose event for a hot plug interrupt, according to one example embodiment of the teachings of the present invention. A runtime general purpose event is detected (302) by one or more of switch(es) 208, legacy bridge type I 214, and legacy bridge type II 216. In one embodiment, the bridge or switch would have circuitry to detect a change in voltage at a connection point, which would indicate a hot plug event. One or more of elements 208, 214, and 216 would have the enhanced feature of generating and transmitting (304) a data packet upstream in response to the general purpose event detected in 302. In one embodiment, the data packet would be a vendor specific message as provided for in the PCI Express specification. The message would contain a message code value that would be understood by the message's intended recipient by comparing to and matching with a known set of one or more codes that denote a general purpose event. Upstream bridges and switches that do not understand the vendor specific message would simply pass the message upstream until it reaches the intended recipient. In one embodiment, the intended recipient of the vendor specific message is I/O controller 224, which would have the enhanced feature of receiving and understanding (306) the vendor specific message transmitted in 304. In the same embodiment, I/O controller 224 would then communicate (308) the general purpose event to the operating system by generating an SCI. In another embodiment, host controller 204 is the intended recipient of the vendor specific message. After receiving and understanding (306) the vendor specific message, host controller 204 then notifies I/O controller 224 of the general purpose event by asserting a general purpose input. In the same embodiment, I/O controller 224 would then communicate (308) the general purpose event to the operating system by generating an SCI.

Figure 4:
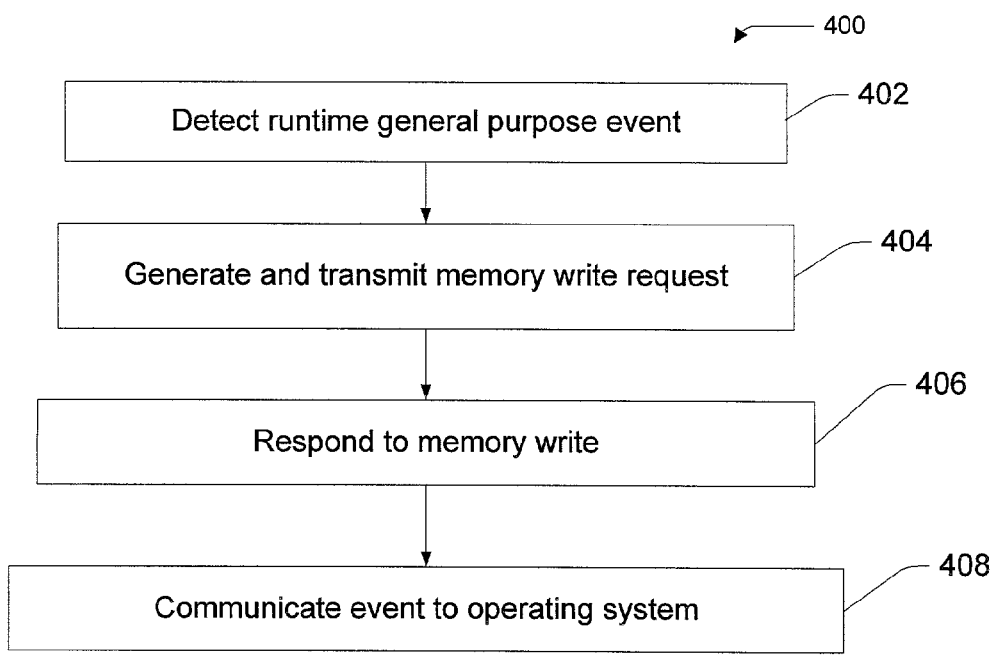
FIG. 4 is a flow chart of an example method of processing a general purpose event, according to an alternate embodiment of the teachings of the present invention.

FIG. 4 is a flow chart of an example method of processing a general purpose event for a hot plug interrupt, according to an alternate embodiment of the teachings of the present invention. A runtime general purpose event is detected (402) by one or more of switch(es) 208, legacy bridge type I 214, and legacy bridge type II 216. In one embodiment, the bridge and/or switch would have circuitry to detect a change in voltage at a connection point, which would indicate a hot plug event. One or more of elements 208, 214, and 216 would have the enhanced feature of generating and transmitting (404) a memory write request denoting the general purpose event detected in 402. In one embodiment, the memory write request would be a PCI Express 32 bit memory write request as provided for in the PCI Express specification. The data and address of the memory write would be understood only by the requesting device and I/O controller 224. I/O controller 224 would be programmed by BIOS to respond (406) to the memory write. In one embodiment, I/O controller 224 would then communicate (408) the general purpose event to the operating system by generating an SCI.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of communicating a runtime general purpose event from a downstream controller without the use of a sideband signal, the method comprising:
   receiving a Peripheral Component Interconnect (PCI) Express data packet from the downstream controller;
   comparing at least a portion of the received packet with one or more codes denoting an associated one or more general purpose events; and
   communicating an identified general purpose event to an operating system if there is a match by generating an ACPI interrupt.

2. The method of claim 1 wherein the PCI Express data packet comprises a vendor specific message.

3. A method of communicating a runtime general purpose event from a downstream controller along a PCI Express bus, the method comprising:
   receiving a PCI Express message;
   comparing at least a portion of the message with one or more codes denoting an associated one or more general purpose events; and
   communicating an identified general purpose event to an operating system if there is a match wherein communicating the general purpose event to an operating system if there is a match comprises generating an ACPI interrupt.

4. The method of claim 3 wherein receiving a PCI Express message comprises receiving a vendor specific message.

5. A computing device comprising:
   means for implementing a PCI Express bus;
   means for detecting a hot plug event; and
   means for communicating the hot plug event in-band through the PCI Express bus means for communicating the hot plug event to an operating system wherein the means for communicating the hot plug event to an operating system comprises: means for receiving a PCI Express message; means for comparing at least a portion of this message with one or more codes denoting an associated one or more hot plug events; and means for generating an ACPI interrupt if there is a match.

6. The computing device of claim 5 wherein the means for communicating the hot plug event in-band through the PCI Express bus comprises:
   means for generating a vendor specific message; and
   means for transmitting the vendor specific message along a PCI Express connection.

7. The computing device of claim 5 wherein the means for communicating the hot plug event to an operating system comprises:
   means for receiving a PCI Express message;
   means for comparing at least a portion of the message with one or more codes denoting an associated one or more hot plug events; and
   means for asserting a signal if there is a match.

8. An apparatus comprising:
   a bridge capable of sending a vendor specific message in response to a hot plug event; and
   a host controller responsive to the vendor specific message to communicate the hot plug event to an operating system, wherein the bridge communicates with the host controller through a PCI Express connection wherein the host controller communicates hot plug event to an operating system by generating an ACPI interrupt.

9. The apparatus of claim 8 wherein the host controller communicates the hot plug event to the operating system by asserting a signal.

10. A method of communicating a runtime general purpose event from a downstream controller along a PCI Express bus, the method comprising:
    performing a memory write that denotes a general purpose event;
    identifying the general purpose event from the memory write; and
    communicating the identified general purpose event to an operating system wherein communicating the general purpose event to an operating system comprises generating an ACPI interrupt.

11. The method of claim 10 wherein performing a memory write that denotes a general purpose event comprises transmitting a 32 bit write request.

* * * * *